(12) United States Patent
Zhang et al.

(10) Patent No.: US 9,244,707 B2
(45) Date of Patent: Jan. 26, 2016

(54) TRANSFORMING USER INTERFACE ACTIONS TO SCRIPT COMMANDS

(75) Inventors: Elisa W. Zhang, Seattle, WA (US); Dean A. Wells, Snohomish, WA (US); Ikrima Elhassan, College Station, TX (US); Satheesh S. Dabbiru, Sammamish, WA (US); Ryan A. Sizemore, Sammamish, WA (US); Vladimir Yarmolenko, Duvall, WA (US); Veneta I. Tashev, Kirkland, WA (US); Matthew F. Steele, Bellevue, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 1097 days.

(21) Appl. No.: 13/013,527

(22) Filed: Jan. 25, 2011

(65) Prior Publication Data

US 2012/0192069 A1 Jul. 26, 2012

(51) Int. Cl.
*G06F 3/048* (2013.01)
*G06F 9/455* (2006.01)
*G06F 9/44* (2006.01)

(52) U.S. Cl.
CPC .......... *G06F 9/45512* (2013.01); *G06F 9/4443* (2013.01)

(58) Field of Classification Search
None
See application file for complete search history.

(56) References Cited

U.S. PATENT DOCUMENTS

| | | | | |
|---|---|---|---|---|
| 5,737,557 A | * | 4/1998 | Sullivan | 715/765 |
| 5,950,002 A | * | 9/1999 | Hoford et al. | 717/109 |
| 7,937,502 B2 | * | 5/2011 | Roenneburg et al. | 710/5 |
| 8,244,837 B2 | * | 8/2012 | Stone et al. | 709/221 |
| 8,316,314 B2 | * | 11/2012 | Wirch et al. | 715/771 |
| 2004/0041827 A1 | | 3/2004 | Bischof et al. | |
| 2005/0091201 A1 | | 4/2005 | Snover et al. | |
| 2005/0138646 A1 | | 6/2005 | Mese et al. | |
| 2005/0210445 A1 | * | 9/2005 | Gough et al. | 717/111 |
| 2005/0278728 A1 | * | 12/2005 | Klementiev | 719/328 |
| 2006/0005132 A1 | | 1/2006 | Herdeg, III | |
| 2007/0088729 A1 | | 4/2007 | Baca et al. | |
| 2008/0021842 A1 | | 1/2008 | Pintos et al. | |
| 2009/0254881 A1 | | 10/2009 | Johnson et al. | |
| 2011/0040824 A1 | * | 2/2011 | Harm | 709/203 |

OTHER PUBLICATIONS

"ptp design document", Pub. Date: Apr. 8, 2005, http://www.eclipse.org/ptp/docs/design.html, (12 pages).

(Continued)

*Primary Examiner* — Matt Kim
*Assistant Examiner* — Tuan S Nguyen
(74) *Attorney, Agent, or Firm* — Aneesh Mehta; Aaron Hoff; Micky Minhas

(57) ABSTRACT

Embodiments are directed to dynamically transforming user interface actions into executable script commands and to storing groups of executable script commands related to specific tasks. In an embodiment, a computer system tracks user interface actions at a software program user interface. The computer system transforms the user interface actions into an executable script command. The script command is configured to perform the tracked user interface action when executed. The computer system also dynamically displays the resulting executable script commands in a script command window as the user interface actions are entered by the computer user. The computer system may further determine that multiple user interface actions correspond to a specified task and store the resulting executable script commands related to the specified task as a combined group of executable script commands.

18 Claims, 4 Drawing Sheets

(56) References Cited

OTHER PUBLICATIONS

Benjamin S. Waldie, "AppleScript Essentials", Pub. Date: 2005, Volume No. 21 (2005), Issue No. 6, Column Tag: Programming (10 pages).

"Using the Mayavi application", Mayavi v3.4.1 documentation, http://code.enthought.com/projects/mayavi/docs/development/html/mayavi/application.ht . . . ,Pub. Date: 2010, (14 pages).

"Windows PowerShell", http://en.wikipedia.org/wiki/Windows_PowerShell, Nov. 22, 2010 (Retrieved Date), (17 pages).

\* cited by examiner

US 9,244,707 B2

TRANSFORMING USER INTERFACE ACTIONS TO SCRIPT COMMANDS

BACKGROUND

Computers have become highly integrated in the workforce, in the home, in mobile devices, and many other places. Computers can process massive amounts of information quickly and efficiently. Software applications designed to run on computer systems allow users to perform a wide variety of functions including business applications, schoolwork, entertainment and more. Software applications are often designed to perform specific tasks, such as word processor applications for drafting documents, or email programs for sending, receiving and organizing email.

In some cases, software applications may be designed to manage various entities often used in corporate business including users, user groups, computer systems, software applications and other items. Administrators who manage these items often perform tasks which are repeated for the various entities. These repetitive tasks are often cumbersome and require a great deal of time from the administrator. Moreover, scripts which may be used to perform these repetitive tasks, are difficult to learn and often do not closely correspond to the actions being performed by the administrator.

BRIEF SUMMARY

Embodiments described herein are directed to dynamically transforming user interface actions into executable script commands and to storing groups of executable script commands related to specific tasks. In one embodiment, a computer system tracks user interface actions at a software program user interface. The computer system transforms the user interface actions into an executable script command. The script command is configured to perform the tracked user interface action when executed. The computer system also dynamically displays the resulting executable script commands in a script command window as the user interface actions are entered by the computer user.

In another embodiment, a computer system tracks user interface actions at a software program user interface. The computer system transforms the user interface actions into an executable script command. The script command is configured to perform the tracked user interface action when executed. The computer system dynamically displays the resulting executable script commands in a script command window as the user interface actions are entered by the computer user. The computer system also determines that multiple user interface actions correspond to a specified task and stores the resulting executable script commands related to the specified task as a combined group of executable script commands.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Additional features and advantages will be set forth in the description which follows, and in part will be obvious from the description, or may be learned by the practice of the teachings herein. Features and advantages of the invention may be realized and obtained by means of the instruments and combinations particularly pointed out in the appended claims. Features of the present invention will become more fully apparent from the following description and appended claims, or may be learned by the practice of the invention as set forth hereinafter.

BRIEF DESCRIPTION OF THE DRAWINGS

To further clarify the above and other advantages and features of embodiments of the present invention, a more particular description of embodiments of the present invention will be rendered by reference to the appended drawings. It is appreciated that these drawings depict only typical embodiments of the invention and are therefore not to be considered limiting of its scope. The invention will be described and explained with additional specificity and detail through the use of the accompanying drawings in which.

DETAILED DESCRIPTION

Figure 1:
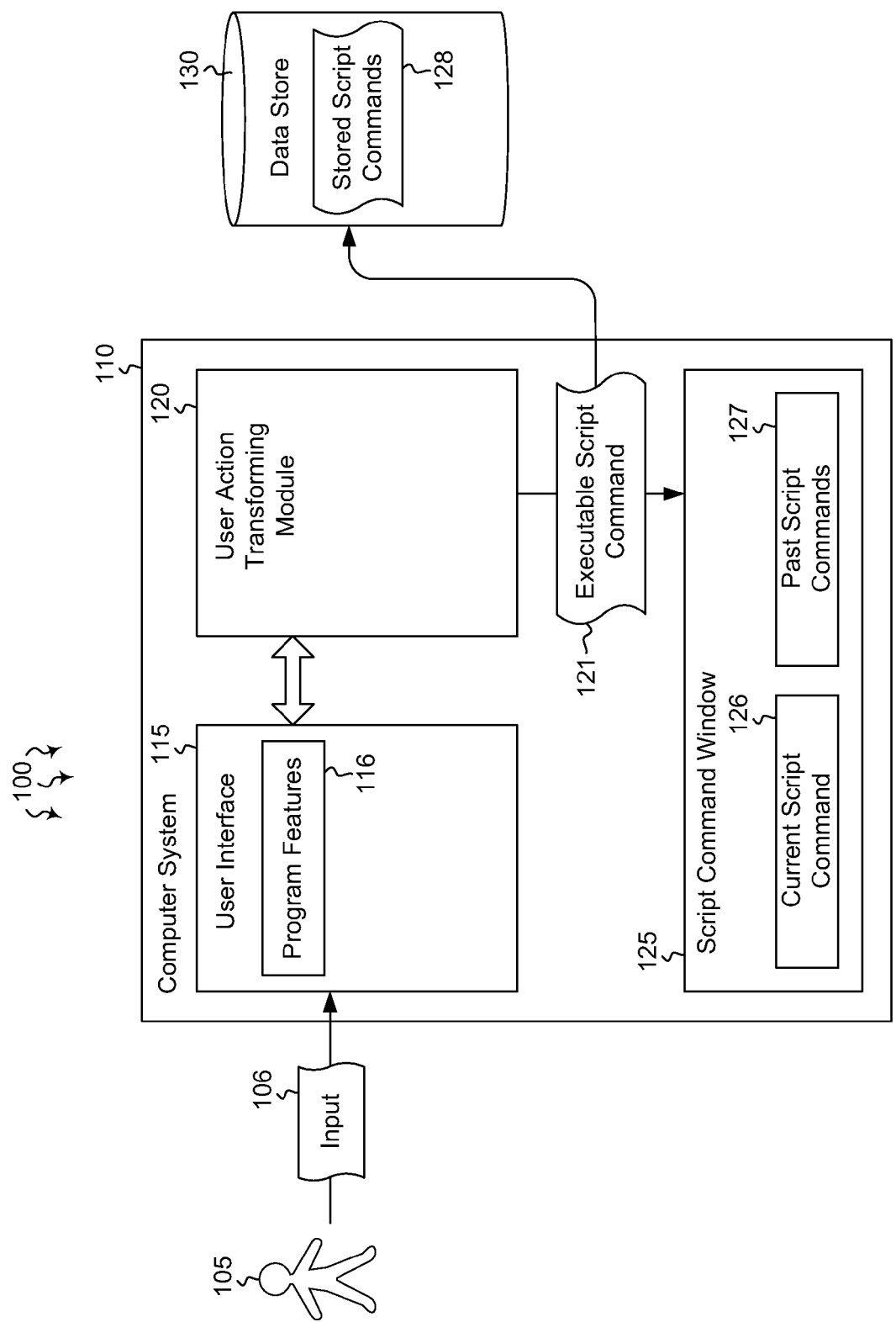
FIG. 1 illustrates a computer architecture in which embodiments of the present invention may operate including dynamically transforming user interface actions into executable script commands and storing groups of executable script commands related to specific tasks.

Embodiments described herein are directed to dynamically transforming user interface actions into executable script commands and to storing groups of executable script commands related to specific tasks. In one embodiment, a computer system tracks user interface actions at a software program user interface. The computer system transforms the user interface actions into an executable script command. The script command is configured to perform the tracked user interface action when executed. The computer system also dynamically displays the resulting executable script commands in a script command window as the user interface actions are entered by the computer user.

In another embodiment, a computer system tracks user interface actions at a software program user interface. The computer system transforms the user interface actions into an executable script command. The script command is configured to perform the tracked user interface action when executed. The computer system dynamically displays the resulting executable script commands in a script command window as the user interface actions are entered by the computer user. The computer system also determines that multiple user interface actions correspond to a specified task and stores the resulting executable script commands related to the specified task as a combined group of executable script commands.

The following discussion now refers to a number of methods and method acts that may be performed. It should be noted, that although the method acts may be discussed in a certain order or illustrated in a flow chart as occurring in a particular order, no particular ordering is necessarily required unless specifically stated, or required because an act is dependent on another act being completed prior to the act being performed.

Embodiments of the present invention may comprise or utilize a special purpose or general-purpose computer including computer hardware, such as, for example, one or more processors and system memory, as discussed in greater detail below. Embodiments within the scope of the present invention also include physical and other computer-readable media for carrying or storing computer-executable instructions and/ or data structures. Such computer-readable media can be any available media that can be accessed by a general purpose or special purpose computer system. Computer-readable media that store computer-executable instructions are computer storage media. Computer-readable media that carry computer-executable instructions are transmission media. Thus, by way of example, and not limitation, embodiments of the invention can comprise at least two distinctly different kinds of computer-readable media: computer storage media and transmission media.

Computer storage media includes RAM, ROM, EEPROM, CD-ROM or other optical disk storage, magnetic disk storage or other magnetic storage devices, or any other medium which can be used to store desired program code means in the form of computer-executable instructions or data structures and which can be accessed by a general purpose or special purpose computer.

A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer, the computer properly views the connection as a transmission medium. Transmissions media can include a network and/or data links which can be used to carry data or desired program code means in the form of computer-executable instructions or data structures and which can be accessed by a general purpose or special purpose computer. Combinations of the above should also be included within the scope of computer-readable media.

Further, upon reaching various computer system components, program code means in the form of computer-executable instructions or data structures can be transferred automatically from transmission media to computer storage media (or vice versa). For example, computer-executable instructions or data structures received over a network or data link can be buffered in RAM within a network interface module (e.g., a "NIC"), and then eventually transferred to computer system RAM and/or to less volatile computer storage media at a computer system. Thus, it should be understood that computer storage media can be included in computer system components that also (or even primarily) utilize transmission media.

Computer-executable instructions comprise, for example, instructions and data which cause a general purpose computer, special purpose computer, or special purpose processing device to perform a certain function or group of functions. The computer executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the invention may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, pagers, routers, switches, and the like. The invention may also be practiced in distributed system environments where local and remote computer systems, which are linked (either by hardwired data links, wireless data links, or by a combination of hardwired and wireless data links) through a network, both perform tasks (e.g. cloud computing, cloud services and the like). In a distributed system environment, program modules may be located in both local and remote memory storage devices.

FIG. 1 illustrates a computer architecture 100 in which the principles of the present invention may be employed. Computer architecture 100 includes computer system 110. Computer system 110 may be any type of computing system including a local, distributed or cloud computing system. The computer system includes user interface 115. The user interface may be any type of software user interface used to interact with a software program or function. The software program to which the user interface corresponds may be run on computer system 110 or on another computer system. The program may be any type of software program that allows users to interact with it. Accordingly, user 105 may interact with the user interface using input 106. The input may be any type of user interaction including input from a mouse or keyboard, touch inputs via a touchscreen, gestures via a motion capture device or other input.

The user interface 115 includes one or more program features 116. These features are program elements such as text, audio, video, buttons, links, forms, data entry boxes or other software program elements with which a user can interact. Each user action or input may be monitored and stored by computer system 110. Such user action logs may be stored in data store 130. Data store 130 may be any type of local or remote storage system, including a distributed system such as a storage area network (SAN) or cloud data store. User action transforming module 120 may be configured to access the tracked user actions and transform the actions to executable script commands. Accordingly, when a user performs a certain action, the user action transforming module 120 may generate an executable script command based on that user action. It should be noted that one user action may result in multiple script commands. Moreover, a user may perform a set of actions that result in a set of script commands.

As used herein, executable script commands may refer to scripts which may be executed to perform a given task. Thus, if a user performs an action on the user interface that, for example, creates a user group, module 120 would generate a script that, when executed, would create a user group. The executable script command 121 may be generated for a specific type of system, or may be a generic executable script, configured for execution on a wide variety of systems. Those scripts that are generated by module 120 may be sent to data store for storage (e.g. store script commands 128), either as single scripts or in groups of scripts, and may be sent to script command window 125 for display.

In some cases, the script command window may display executable script commands dynamically as they are being generated. Accordingly, current script command 126 may correspond directly to what user 105 is inputting at user interface 115. Continuing the example above where a user creates a group of users, as the user enters the user interface actions that create a group of users, module 120 transforms the user's actions into an executable script command, which is displayed in window 125. As such, the window shows a live feed of how the user's actions are being transformed into script commands. Previously generated script commands 127 may also be displayed in the script command window. Other aspects of the script command window will be explained in greater detail below.

Figure 2:
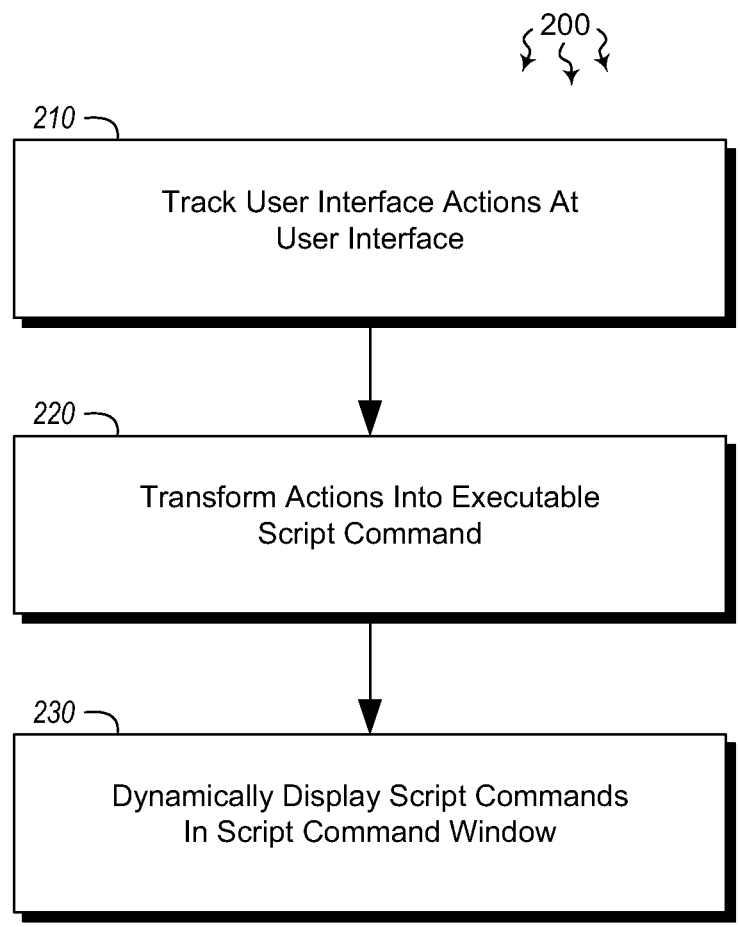
FIG. 2 illustrates a flowchart of an example method for dynamically transforming user interface actions into executable script commands.
Figure 3:
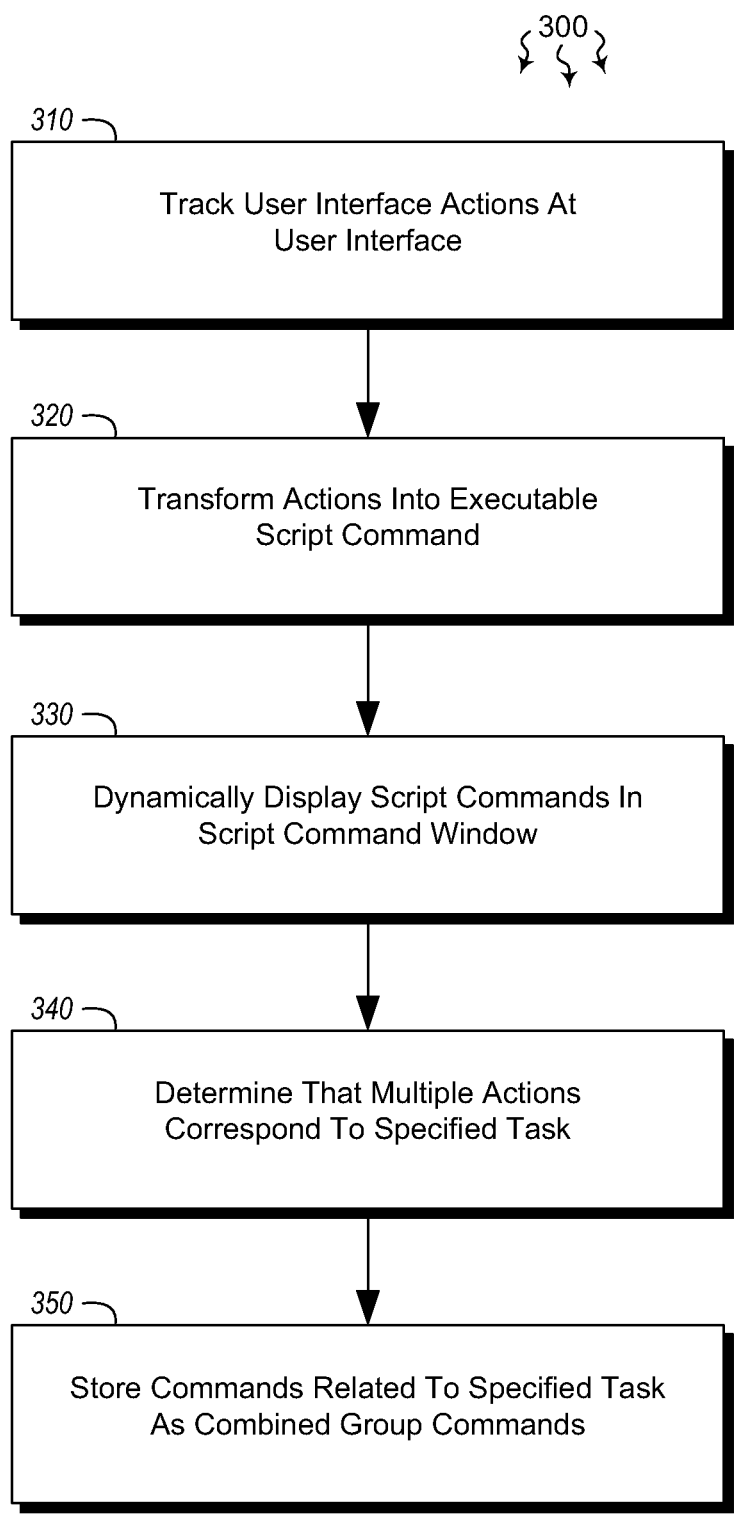
FIG. 3 illustrates a flowchart of an example method for storing groups of executable script commands related to specific tasks.

In view of the systems and architectures described above, methodologies that may be implemented in accordance with the disclosed subject matter will be better appreciated with reference to the flow charts of FIGS. 2 and 3. For purposes of simplicity of explanation, the methodologies are shown and described as a series of blocks. However, it should be understood and appreciated that the claimed subject matter is not limited by the order of the blocks, as some blocks may occur in different orders and/or concurrently with other blocks from what is depicted and described herein. Moreover, not all illustrated blocks may be required to implement the methodologies described hereinafter.

FIG. 2 illustrates a flowchart of a method 200 for dynamically transforming user interface actions into executable script commands. The method 200 will now be described with frequent reference to the components and data of environments 100 and 400 of FIGS. 1 and 4, respectively.

Method 200 includes an act of tracking one or more user interface actions at a software program user interface, wherein the user interface actions are input by a computer user (act 210). For example, computer system 110 may track user 105's interactions with user interface 115. The computer system may be configured to track some or all of the user's actions, and may be configured to store some or all of the user's actions in data store 130. The tracked actions may be organized into various groups or stored individually. The user's tracked actions may be stored temporarily or permanently. In some cases, the user may be able to clear or reset a group of tracked interface actions.

In some cases, the actions may be grouped together as part of a process. For instance, if the process of setting up a user account involved multiple steps, the computer system could store each of the user interface actions involved in that process as a group of actions. In some cases, all or parts of a group of actions may be implemented with other individual actions or groups of actions. As mentioned above, the user interface may be an interface for any type of software program, including management tools for managing users, groups, resources and other software program items.

Method 200 includes an act of transforming the one or more user interface actions into an executable script command, such that the script command is configured to perform the tracked user interface action when executed (act 220). For example, user action transforming module 120 may transform the user interface actions into executable script commands 121. The executable script commands are designed to perform the tracked user interface actions when they are executed by the computer system. In some cases, module 120 may transform or generate the executable script commands dynamically while the user inputs are being received. These scripts may then be stored, modified or transferred to other modules including script command window 125.

Method 200 includes an act of dynamically displaying the resulting executable script commands in a script command window as the user interface actions are entered by the computer user (act 230). For example, script command window 125 may dynamically display executable script commands 121 as the user interface actions are entered by user 105. In this manner, a user may be able to see how an input (e.g. 106) is transformed from a user interaction into an executable script command. Seeing this transformation may better inform the user how to write such scripts from scratch.

In some embodiments, the script command window may highlight those software program elements that correspond to the dynamically displayed executable script command. Thus, if certain program features 116 are being used, those features may be highlighted in the scripts shown in the script command window. The script window may be integrated in other software applications. For instance, the window may be integrated into a web page or as part of a web browser or as part of a spreadsheet or other document. The script command window may then be usable to author scripts in that other application.

The script command window may further show task markings. For instance, in cases where multiple user interface actions are part of a given task or process, a user may mark the beginning of the process and have that mark be displayed in the window. The user may then indicate the end of the process, upon which the window will show an end mark next to or below the last executable script command. In this manner, a user may clearly see in the generated scripts where the beginning of the task was and where the end was. These tasks that include groups of scripts may be stored together and later used to perform the task. Tasks may also be created dynamically by the user action transforming module 120. For instance, the user action transforming module may be designed to recognize a specific set of actions through the use of a heuristic when a user is being created. Upon recognizing this set of tasks, the user action transforming module may automatically designate sets of actions as tasks.

Figure 4:
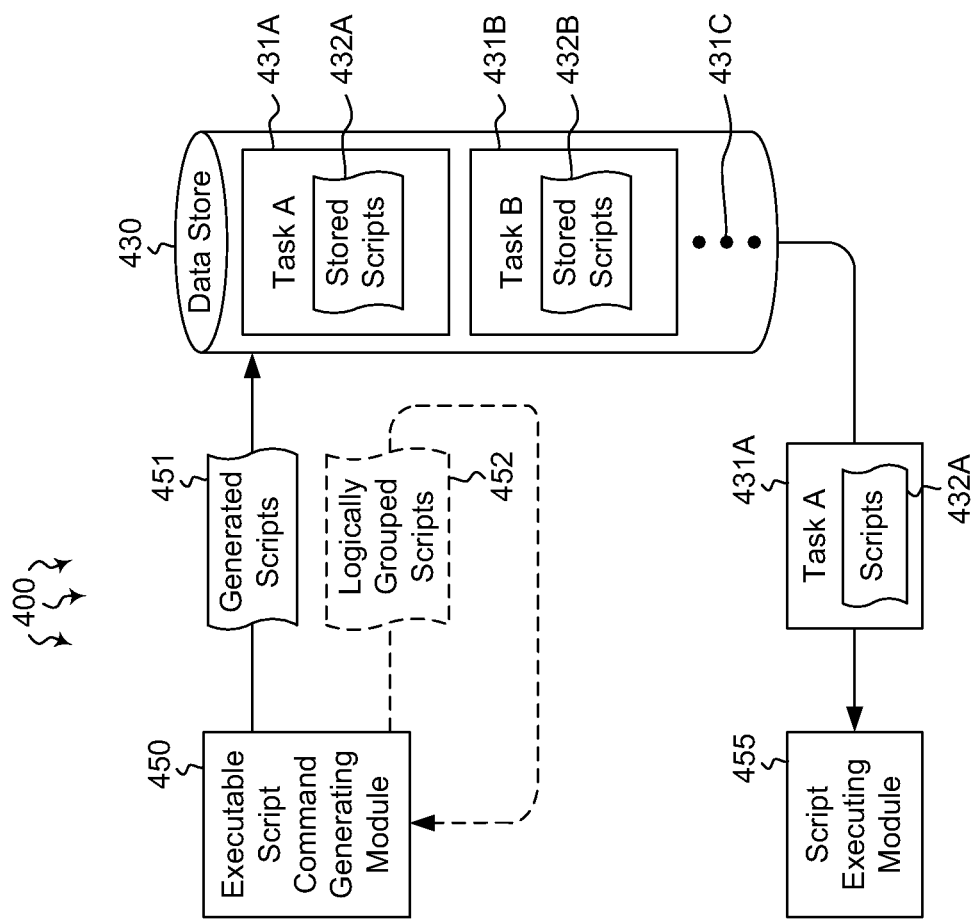
FIG. 4 illustrates an embodiment of the present invention in which executable script commands are grouped and stored in a data store.

As shown in FIG. 4, executable script command generating module 450 may generate one or more scripts 451 that are part of a task (or set of logically related tasks 452 (e.g. creating and configuring a user account)). These generated scripts may be stored in data store 430 as part of a given task (e.g. stored scripts 432A are stored as part of task A (431A), scripts 432B are stored as part of task B (431B), etc.). Although tasks A and B are shown in FIG. 4, it should be noted that substantially any number of additional tasks (e.g. 431C) may be stored in the data store. The stored tasks may be used by script executing module 455 to perform a requested task. Thus, a user may interact with a software interface to perform an action and have those actions converted or transformed to executable script commands. Those scripts may be displayed, stored and/or used to perform the tasks as needed by the user.

Returning to FIG. 1, the script command window 125 may be dockable and snappable to specified parts of a software program window. Thus, a user may specify that the window is to be docked in a corner or other part of the window or computer screen. The script command window may also be dragged via mouse, touch, gestures or other input to a given part of a program window where the script command window will be snapped into place. The window 125 may allow those scripts that are displayed (e.g. 126 and/or 127) or stored on data store 130 (e.g. stored scripts 128) to be edited by the user. The user may copy and paste selected executable script commands into a script editor for further editing or tweaking. The copy and pasted executable script commands may be saved to a file (singly or as a group). This file may then be transferred (e.g. via email) or copied to other computer systems or other users.

The script command window may be configured to display the generated executable script commands in a variety of different manners. For instance, the script command window may display each script command in a single line individually. Alternatively, the script command window may display multiple script commands. The commands may be formatted based on various parameters. For instance, the script commands may be highlighted, indented, colored, bolded, italicized or otherwise formatted to assist a user in identifying and learning the usage of the parameter. In some cases, for example, a parameter may indicate whether it is optional or required.

In some embodiments, a user may be able to select a number of executable script commands and provide an input (e.g. a right-click on a mouse) indicating that the executable script commands are to be executed in a specified software program. In this manner, other programs may be able to execute the generated scripts. Similarly, a user may be able to provide an input such as a right-click on a script to get additional information about that script. In some cases, the scripts may be grouped together or organized based on different identifying characteristics. For instance, those scripts that include certain words, data types, user actions or other characteristics, may be grouped together. The members of these groups may be identified with metadata that is associated with each member of the group.

In some embodiments, a user may create a group of script commands after the script commands have been generated. For example, a user may perform multiple actions in the user interface, see the generated script commands in the script commands window, and decide to group one or more of the script commands. The group may then be stored as a specialized group, and may be executed in a specified manner, as indicated above.

The executable script commands may be filtered based on various different criteria including group, user, executable script command type, keyword and other commands. As such, a user may be able to search through multiple different stored scripts and filter the results by criteria type. The script commands may be stored in a specialized format that is easily and efficiently searchable. In some cases, those script commands not meeting a specified relevance criteria may be filtered so that the irrelevant, filtered scripts do not appear in the script command window. The script commands may also be searched by time of execution or by time of creation. Searched script commands may be sorted according to various different criteria including name, date of execution (e.g. by timestamp), user, group or other criteria.

Stored scripts may be accessed and modified by a user. The user may access a single script or a group of scripts, edit those scripts, and store the edited scripts as new scripts, or they can overwrite the old scripts. In some embodiments, the edits may be derived from user interface actions. Thus, if a user desired to edit a task that included multiple scripts (and, therefore, multiple user actions), the user may be able to re-perform the user interface actions, whereupon the user action transforming module will transform the user's actions to executable script commands which will edit (or replace entirely) the previously existing scripts for that task. Many different user actions may be captured and stored by the computer system, and may be used to update or edit the previously stored versions.

Turning now to FIG. 3, FIG. 3 illustrates a flowchart of a method 300 for storing groups of executable script commands related to specific tasks. The method 300 will now be described with frequent reference to the components and data of environments 100 and 400 of FIGS. 1 and 4, respectively.

Method 300 includes an act of tracking one or more user interface actions at a software program user interface, wherein the user interface actions are input by a computer user (act 310). For example, computer system 110 may track input 106 from user 105 at user interface 115. The user may be interacting with various program features 116 of the software application. In some cases, the user may specify the beginning of a task (e.g. task A (431A)) that includes multiple steps. The user may then input each of the steps of that task and, upon completion, indicate the end of the task. The computer system may then store the task as a series of steps. The computer may also store the resulting set scripts that are generated based on the steps performed by the user that were part of the task.

Method 300 includes an act of transforming the one or more user interface actions into an executable script command, such that the script command is configured to perform the tracked user interface action when executed (act 320). For example, user action transforming module 120 may transform user 105's interface actions into executable script commands. Those script commands, when executed, then perform the interface actions. As mentioned above, multiple script commands may be stored together as part of a task (e.g. stored scripts 432A of task A), and may be executed together to accomplish the task.

Method 300 includes an act of dynamically displaying the resulting executable script commands in a script command window as the user interface actions are entered by the computer user (act 330). For example, script command window 125 may dynamically display the executable script commands 121 as they are being generated by the transforming module 120. Thus, a user may be able to enter an interface action, and substantially simultaneously, see the outputted script command in the script command window. This window may be movable within the computer system display, and may be used in other programs. Moreover, currently displayed (e.g. 126) or previously generated scripts 127 may be copied and pasted into other windows or files for execution on or transmission to other computer systems.

Method 300 includes an act of determining that a plurality of user interface actions correspond to a specified task (act 340). For example, user 105 may indicate that a certain sequence of actions is part of a common task (e.g. task B (431B)). Executable script command generating module 450 may generate scripts 451 that are part of that common task. Those scripts are stored with the specified task (e.g. 432B) as a combined group of executable script commands (act 350). The scripts may then be executed by script executing module 455. The scripts may executed together (in succession) to perform the multi-step task as entered by the user at the user interface.

In some cases, errors may occur when transforming user interface actions into executable command scripts. In such cases, the user action transforming module may be configured to handle the error and give the user information about the error. The information may include data showing what user interface action was received at the transforming module, how the transforming module attempted to transform the action, and how the error might be resolved. Various colors, words and/or symbols may be used to feature different types of errors, or highlight areas where error may have occurred.

Accordingly, methods, systems and computer program products are provided which dynamically transform user interface actions into executable script commands. These executable script commands are storable, searchable, modifiable and reusable. Moreover, methods, systems and computer program products are provided which store groups of executable script commands related to a specific task in a data store. These groups of scripts belonging to a common task may be executed as a group to perform a multi-step task.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

We claim:

1. A method, implemented at a computer system that includes one or more processors, for dynamically transforming user interface actions into executable script commands, the method comprising:

tracking a plurality of user interface actions at a software program user interface, the user interface actions comprising selection of one or more features which consist of program elements of a software program which provide for user interaction with the software program, and wherein the tracked user interface actions include marking the beginning of a task and the end of the task in the software program;

inputting said plurality of tracked user actions to a transforming module which transforms the plurality of user interface actions into one or more executable script commands corresponding to each tracked user action that is input, the executable script commands being configured to perform the corresponding tracked user interface action when executed;

dynamically displaying in a first portion of a script command window executable script commands being generated as a live feed in said first portion of the script command window so that transformed user interface actions are immediately viewable as executable script commands by the user as said user interface actions are transformed into executable script commands at said transforming module, and wherein the marked beginning of the task and the marked end of the task are automatically generated by the transform module and appear in corresponding portions of the dynamically displayed script command window;

the transform module automatically highlighting software program elements in the software program that correspond to the tracked user interactions dynamically displayed as script commands in the script command window;

the transforming module filtering one or more executable script commands displayed in the script command window based on specified relevance criteria, and when executable script commands do not meet the specified relevance criteria the transforming module automatically filtering the executable script commands so that the filtered executable script commands do not dynamically appear in the script command window as part of the live feed from the transforming module; and simultaneously displaying in a second portion of the script command window past script commands that have been generated.

2. The method of claim 1, further comprising storing in a data store in a searchable format the executable script commands.

3. The method of claim 1, further comprising modifying one or more of the executable script commands generated by said transforming module.

4. The method of claim 3, wherein one or more of the executable script command modifications are based on interactions with the software program user interface.

5. The method of claim 1, further comprising rendering the script command window usable to author executable script commands for other applications by integrating the script command window in one or more other software applications.

6. The method of claim 5, wherein the script command window is at least one of dockable and snappable to specified parts of a window at least one software application.

7. The method of claim 5, further comprising selecting a plurality of executable script commands to be executed in at least one specified software program of said one or more software programs.

8. The method of claim 1, wherein the software program comprises a management tool for managing users, groups, resources and other software program items.

9. The method of claim 1, further comprising copying and pasting one or more selected executable script commands into a script editor for editing.

10. The method of claim 9, further comprising saving the copy and pasted executable script commands to a file, wherein the file is transferable to other computer systems.

11. The method of claim 1, further comprising grouping one or more executable script commands using one or more different identifying characteristics.

12. The method of claim 1, further comprising providing additional information about an executable command script displayed in said script command window in response to receiving a request for said additional information.

13. The method of claim 1, further comprising saving a log of the tracked plurality of user interface actions, and generating executable script commands from the saved log of tracked user interface actions.

14. A computer program product comprising one or more hardware storage devices having stored thereon computer-executable instructions that are executable by one or more processors of a computing system, and that configure the computing system to transform user interface actions into executable script commands related to specific tasks, including computer-executable instructions that that configure the computing system to perform at least the following:

track a plurality of user interface actions at a software program user interface, the user interface actions comprising selection of one or more features which consist of program elements of a software program which provide for user interaction with the software program, and wherein the tracked user interface actions include marking the beginning of a task and the end of the task in the software program;

store a log of the tracked plurality of user interface actions in a data store;

retrieve said log of tracked user interface actions and inputting said plurality of tracked user interface actions to a transforming module which transforms the plurality of user interface actions into one or more executable script commands corresponding to each tracked user action that is input, the executable script commands being configured to perform the corresponding tracked user interface action when executed;

dynamically display executable script commands in a first portion of a script command window so that transformed user interface actions are immediately viewable in said first portion as script commands by the user as said user interface actions are transformed by said transforming module, and wherein the marked beginning of the task and the marked end of the task are automatically generated by the transforming module and appear in corresponding portions of the dynamically displayed script command window;

the transforming module automatically highlighting software program elements in the software program that correspond to the tracked user interactions dynamically displayed as script commands in the script command window;

filter one or more executable script commands based on specified relevance criteria so that filtered executable script commands not meeting the specified relevance criteria do not appear in the script command window;

simultaneously display in a second portion of the script command window past script commands that have been generated;

determine that a plurality of tracked user interface actions correspond to a specified task;

store in a data store the executable script commands determined to correspond to said specified task as a combined group of executable script commands; and retrieve and execute the combined group of executable script commands as required when running the software program.

15. The computer program product of claim 14, wherein the stored executable script commands are stored in a searchable format.

16. A computer system comprising:
one or more processors;
system memory; and
one or more computer-readable storage devices having stored thereon computer-executable instructions that are executable by the one or more processors, and that configure the computer system to dynamically transform user interface actions into executable script commands related to specific tasks, including computer-executable instructions that configure the computer system to:

at a software program user interface at an application server, track a plurality of user interface actions at a software program, the user interface actions comprising selection of one or more features which consist of program elements of the software program which provide for user interaction with the software program, and wherein the tracked user interface actions include marking the beginning of a task and the end of the task in the software program;

input said plurality of tracked user actions to a transforming module which generates one or more executable script commands corresponding to each tracked user action that is input, the executable script commands being configured to perform the corresponding tracked user interface action when executed;

dynamically display in a first portion of a script command window executable script commands being generated as a live feed in said first portion of the script command window so that transformed user interface actions are immediately viewable as script commands by the user as said user interface actions are transformed into script commands by said transforming module, and wherein the marked beginning of the task and the marked end of the task are automatically generated by the transforming module and appear in corresponding portions of the dynamically displayed script command window;

the transforming module automatically highlighting software program elements in the software program that correspond to the tracked user interactions dynamically displayed as executable script commands in the script command window;

filter one or more executable script commands based on specified relevance criteria so that filtered executable script commands not meeting the specified relevance criteria do not appear in the script command window;

simultaneously display in a second portion of the script command window past executable script commands;

determine that a plurality of tracked user interface actions correspond to a specified task;

store in a data store the executable script commands determined to correspond to said specified task as a combined group of executable script commands; and retrieve and executing the combined group of executable script commands as required when running the software program.

17. The computer system of claim 16, also including computer-executable instructions that configure the computer system to copy and paste one or more selected executable script commands into a script editor for editing.

18. The computer system of claim 17, also including computer-executable instructions that configure the computer system to save the copied and pasted executable script commands to a file, wherein the file is transferable to other computer systems.

* * * * *